(12) United States Patent
Okano et al.

(10) Patent No.: US 6,512,671 B1
(45) Date of Patent: Jan. 28, 2003

(54) PERIPHERAL APPARATUS FOR PERSONAL COMPUTER CAPABLE OF RESPONDING TO VARIOUS DEMANDS IN REGARD TO APPEARANCE WITH LOW COST

(75) Inventors: Yoshihiro Okano, Atsugi (JP); Manabu Ogasawara, Musashino (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 23 days.

(21) Appl. No.: 09/687,539

(22) Filed: Oct. 13, 2000

(30) Foreign Application Priority Data

| Oct. 15, 1999 | (JP) | ......................................... | 11-293522 |
| Oct. 15, 1999 | (JP) | ......................................... | 11-293665 |
| Oct. 15, 1999 | (JP) | ......................................... | 11-293777 |
| Oct. 15, 1999 | (JP) | ......................................... | 11-293781 |

(51) Int. Cl.[7] ................................................ G06F 1/16
(52) U.S. Cl. ........................ 361/686; 361/683; 361/684; 361/685
(58) Field of Search ........................ 361/679, 683–686, 361/704, 707, 752, 753, 756

(56) References Cited

U.S. PATENT DOCUMENTS

| 5,253,133 | A |   | 10/1993 | Guo |
| 5,258,888 | A | * | 11/1993 | Korinsky .................... 361/704 |
| 5,828,905 | A |   | 10/1998 | Rao |
| 6,141,221 | A | * | 10/2000 | Tong et al. .................. 361/724 |

FOREIGN PATENT DOCUMENTS

| EP | 0 834 455 A1 |   | 4/1998 |            |
| GB | 2 259 443 A  |   | 3/1993 |            |
| GB | 2 290 700 A  | * | 9/1996 | G11B/33/02 |
| GB | 2 299 700 A  |   | 10/1996 |           |

* cited by examiner

Primary Examiner—Darren Schuberg
Assistant Examiner—Yean-Hsi Chang
(74) Attorney, Agent, or Firm—Frishauf, Holtz, Goodman & Chick, P.C.

(57) ABSTRACT

A peripheral apparatus comprises lower and upper resin casings made from resin by an injection molding and engaged to each other so as to upwardly and downwardly cover an electrical unit. The lower resin casing is provided with a primary dent portion/a primary projecting portion formed at a primary location in the depth direction of the peripheral apparatus. The primary dent potion/the primary projecting portion dents/projects into/from a primary parting-line of the lower resin casing for the injection molding. The upper resin casing is provided with a secondary projecting portion/a secondary dent potion formed at a secondary location corresponding to the primary location. The secondary projecting portion/the secondary dent portion projects/dents from/into a secondary parting-line of the upper resin casing for the injection molding. The lower and the upper resin casings are held by each other so as to match with each other in the depth direction by engaging the primary dent portion/the primary projecting portion and the secondary projecting portion/the secondary dent portion.

12 Claims, 6 Drawing Sheets

PERIPHERAL APPARATUS FOR PERSONAL COMPUTER CAPABLE OF RESPONDING TO VARIOUS DEMANDS IN REGARD TO APPEARANCE WITH LOW COST

BACKGROUND OF THE INVENTION

This invention relates to a peripheral apparatus for a personal computer arranged adjacent to a casing of the personal computer and electrically connected to the personal computer, and in particular to a peripheral apparatus constructed by packaging therein an electrical unit capable of being installed in the casing of the personal computer.

As well known, various kinds of peripheral apparatuses can be connected with the personal computer.

Recently, a recording medium, a data compressing format, and an error correcting method are developed, respectively. The recording medium is recordable data and has large recording-capacity. The data compressing format has high compression-rate. The error correcting method is capable of accurately correcting error of recorded data. With these development, a storage apparatus for recording/reproducing data to/from such recording medium as a CD-R (Compact Disc-Recordable), a CD-RW (CD-ReWritable), a DVD-RAM (Digital Versatile Disc-Random-Access Memory), or a DVD-RW is beginning to very spread.

Recently, a recording medium, a data compressing format, and an error correcting method have been developed, respectively. The recording medium is capable of recording data and has a large recording capacity. The data compressing format has a high compression rate. And the error correcting method is capable of correcting errors in the recorded data. With these developments, storage apparatuses for recording/reproducing data to/form a recording medium such as a CD-R (Compact Disc-Recordable) a CD-RW (CD-ReWritable), a DVD-RAM (Digital Versatile Disc-Random-Access Memory), or a DVD-RW are becoming very popular.

More concretely, the USB includes not only USB 1.x but also USB 2.x which is upper compatible with the USB 1.x. The USB 2.x can perform a transmission of the data with much higher speed than the USB 1.x. Therefore, the USB 2.x is favorable as the interface for the storage apparatus. Furthermore, as the next generation interface high in transmitting speed, an IEEE (Institute of Electrical and Electronics Engineers) 1394 (IEEE 1394 interface) is also developed.

The peripheral apparatus using the next generation such as the USB performs the following merits.

1. The user of the personal computer can use the peripheral apparatus easily without much experience of the use of the personal computer. This is caused by unnecessary of using an enhanced interface board necessary for a SCSI (Small Computer System Interface) and of setting of an ID (Dentity) number necessary for the SCSI.

2. It is possible to connecting/disconnecting the peripheral apparatus to the personal computer if the personal computer or an operating system is working (this is called as "hot-plugging"). Therefore, the inexperienced user can use the peripheral apparatus easily.

3. The USB makes the personal computer to be sufficient to interface with various kinds of the peripheral apparatus. Therefore, the personal computer can be reduced in size because it is sufficient for the personal computer to have less number or kind of the connector for interfacing.

Because of the merits 1 and 2 and because the personal computer tends to have less number of the storage apparatus caused by the merit 3, a greater number of users of the personal computer tend to use the peripheral apparatus using the next generation interface including the storage apparatus. Because the greater number of users use the peripheral apparatus, the peripheral apparatus is requested to be still easily used. Furthermore, the peripheral apparatus is requested to be designed so as to match a design of the personal computer, taste of the user, or an interior design of a room where the peripheral apparatus is arranged and so as to be refined as so called. For example, the personal computer of a desk-top type/a notebook type designed and manufactured by Apple Computer which is called as "iMac/iBook" has the USB and less number of storage means. The personal computer is easily used and has a casing (body) mainly made from resin and colored with a color selected by the user when the user buys the personal computer from various colors provided by a maker. The colors include a translucent or a skeleton color added pigment. The user of such personal computer requests for the peripheral apparatus to be still easily used and to be designed so as to match the design of the personal computer, the taste of the user, or the interior design of the room and so as to be refined.

On the other hand, from the standpoints of manufacture and performance of the peripheral apparatus, it is preferable that the peripheral apparatus is excellent in cost-performance ratio and can be efficiently manufactured in a short time. Furthermore, it is also preferable that the peripheral apparatus is sufficiently provided with measures of electric noise-absorbing and heat-radiation. Still, it is preferable that the peripheral apparatus can prevent the user from mistaking the use of the peripheral apparatus.

Conventionally, the peripheral apparatus, in particular, the storage apparatus is designed so as to use as possible many parts in common with an interior unit installed in the personal computer. As regards a CD-R drive for example, a CD-R drive unit having a disc-tray loading mechanism, a disc rotating mechanism, and optical head carriage drive mechanism as mechanism parts and an electric circuit without the interface and a power supply as electric parts is often designed so as to be used as both of the peripheral apparatus and the interior unit.

The electrical unit used as both of the peripheral apparatus and the interior units as mentioned above generally has a lower chassis made from metal which mounts thereon the mechanism parts and the electric circuit parts (The electrical unit may also have an upper chassis made from metal.). Furthermore, the electrical unit mostly as a front panel made from resin and attached to a front portion of the lower and/or upper chassises. The front panel is provided with a slot for projecting an eject-button therethrough and a hole for inserting and removing the recording medium therethrough and has a main surface worn makeup. The front panel is outwardly exposed from the personal computer or the peripheral apparatus.

The peripheral apparatus generally has the electrical unit mentioned above, the interface portion, the power supply, and a metal casing made from metal and worn makeup for containing the electrical unit, the interface portion, and the power supply therein. A front portion of the metal casing in a depth direction is opened. The front panel is attached to the front portion of the metal casing so as to cover the front portion. Generally, there are concretely three types of attaching the front panel to the peripheral apparatus as follows:

1. A type has a first front panel used for the electrical unit used as both of the peripheral apparatus and the interior unit and a second front panel used for the peripheral apparatus only. The second front panel is provided with a square hole and can expose the first front panel through the square hole so that main surfaces of the first and the second front panels are located on same location as each other.

2. Another type has a third front panel used for both of the peripheral apparatus and the interior unit or for the peripheral apparatus only. The third front panel has a cap shape. When the third panel is directed so that an opening thereof faces rearwardly in the depth direction, the third front panel can contain the front portion of the metal casing and can cover the casing.

3. The other type has the first front panel used for the electrical unit used as both of the peripheral apparatus and the interior unit, a resin casing having lower and upper pieces capable of separating to each other, and a front holder attached to a front portion of the resin casing. The front holder covers the front portion of the resin casing.

For example, the type 3 has lower and upper pieces for covering an electrical unit and a front holder. If the lower and the upper pieces are coupled with each other so as to be offset to each other in the depth direction, this offset is hidden by the front holder. Thus, the type 3 can change a defection article caused by an appearance defection by the offset into a passing article if the offset exerts bad influence upon movement of the electrical unit.

Three types of the peripheral apparatuses mentioned above have matters as the following because of structures at the front portions, respectively.

Because the type 1 has two front panels, the type 1 has many parts and large size. Furthermore, only if the front panels are slightly offset to each other in the depth direction, the peripheral apparatus may conclude as appearance defection.

Although it is sufficient for the type 2 to have the front panels to the number of only one as the peripheral apparatus, the front panel is large in size in the depth direction. When the front panel is used for the interior unit, it is useless for the interior unit that the front panel is large in size. On the other hand, in order to use the front panel for the peripheral apparatus only, it is necessary to individually design and manufacture the front panels for the peripheral apparatus and the interior unit. Therefore, the type 2 is also useless. Furthermore, only if a surface of the front panel and a surface of the metal casing are slightly offset to each other in a width or a height direction, the peripheral apparatus may conclude as appearance defection. Particularly, because the metal casing is made from sheet metal which is thin and therefore bendable, it is difficult to reduce the offset. In addition, in order to prevent the metal casing from being offset, it is necessary to previously from many ribs on an inside of the front panel and to previously form a front edge portion of the metal casing into a stepwise shape. Namely, the type 2 is complex in structure and difficult in manufacturing and assembling.

Furthermore, both of the types 1 and 2 on the premise to use the metal casing. Herein, the metal casing occupies the major part of the peripheral apparatus without the electrical unit and is therefore still conspicuous regarding as appearance for the user of the peripheral apparatus. When it is took into consideration that the peripheral apparatus is requested to be designed so as to match a design of the personal computer, taste of the user, or an interior design of a room where the peripheral apparatus is arranged and so as to be refined as mentioned above, it is necessary for a manufacturer of the peripheral apparatus to prepare various shape and colors of the metal casing.

However, it is the actual circumstances that the metal casing is lacking in flexibility of forming into various shapes.

In order to settle this matter, it is proposed to also make the casing of the peripheral apparatus from resin as the casing of the personal computer mentioned above. Furthermore, it is requested to change metal parts into resin parts in the peripheral apparatus as more as possible in order to reduce a cost for manufacturing the peripheral apparatus.

In addition, the user often loses interest in the appearance of the peripheral apparatus and demands the change the peripheral apparatus into new one after using the peripheral apparatus for a period of time. However, it is difficult in finance for the user to buy a new peripheral apparatus according to the appearance only.

The peripheral apparatus tends to be badly affected by electromagnetic noise coming inwardly from outside of the peripheral apparatus as like as the other electric apparatus while the peripheral apparatus rarely emit bad radiant noise. Therefore, it is necessary for the peripheral apparatus to provide shield plate means against the noises coming inwardly and outwardly. If the peripheral apparatus has comprised the upper chassis as mentioned above serving as the shield plate means, the upper chassis may be insufficient in shielding efficiency. Herein, if the peripheral apparatus is covered with the metal, the shielding efficiency is sufficient. In contrast, if the peripheral apparatus is covered with the resin casing, the shielding efficiency is insufficient. Furthermore, the peripheral apparatus (the storage apparatus) for recording data to the CD-R, the CD-RW, or the DVD-RAM emits laser beam still more power than the peripheral apparatus for reproducing data from the CD-ROM. Therefore, the peripheral apparatus for the CD-R, the CD-RW, or the DVD-RAM exhausts heat more than the other peripheral apparatus. For such peripheral apparatus, it is necessary to radiate heat sufficiently.

Because the type 3 has the front holder in addition to the front panel, the type 3 has many parts and large size. Furthermore, the type 3 is many in the step number of manufacturing and assembling.

Often, the peripheral apparatus as the storage apparatus must be installed so as to be substantially level with the ground in the width and the depth directions (this is called as level installation). This is caused by the following reason. Generally, the medium such as the CD-R or the CD-RW is not packaged with a package differently from most of the DVD-RAM and the DVD-RW or an MO (a Magneto Optical disc). Therefore, if the peripheral apparatus is not installed so as to be substantially level with the ground in the width and the depth directions, the medium may drop unless the medium is contained in the package or a disk table of the peripheral apparatus is provided with holding means for the medium. However, because the peripheral apparatus for the CD-R or the CD-RW is relatively small in size, the user rarely installs the peripheral apparatus by mistake so that the peripheral apparatus is vertical to the ground in the width or the depth direction (this is called as vertical installation). Conventionally, in order to prevent the vertical installation, an instruction is described on an explanation (guidebook) for the peripheral apparatus or an outer surface of the peripheral. The instruction can inform the user that the peripheral apparatus is useless when the peripheral apparatus is installed in vertical and therefore the peripheral apparatus must be installed in level. However, a settlement by the instruction is passive and therefore cannot achieve the end. Namely, the user may not notice the instruction. Therefore, more active settlement so that the user can notice is requested.

SUMMARY OF THE INVENTION

It is therefore an object of this invention to provide a peripheral apparatus for a personal computer capable of responding to various demands in regard to appearance and of being manufactured in low cost and excellent efficiency.

It is another object of this invention to provide a peripheral apparatus capable of preventing the user from using by mistake.

It is still another object of this invention to provide a peripheral apparatus capable of radiating heat sufficiently outwardly.

It is another object of this invention to provide a peripheral apparatus capable of easily changing appearance thereof according to demands by the user.

The other objects, features, and advantages of this invention will become clear as the following description proceeds.

A peripheral apparatus to which this invention is applicable is arranged in adjacent to a casing of a personal computer with being electrical connection with the personal computer and used for the personal computer, the peripheral apparatus being assembled by packaging therein an electrical unit having a front panel attached to a front portion thereof in a depth direction, the electrical unit being capable of being installed in the casing of the personal computer with exposing the front panel outwardly. The peripheral apparatus comprises lower and upper resin casings made from resin by an injection molding and engaged to each other so as to upwardly and downwardly cover the electrical unit. The lower resin casing is provided with a primary dent portion/a primary projecting portion formed at a primary location in the depth direction of the peripheral apparatus. The primary dent portion/the primary projecting portion dents/projects into/from a primary parting-line of the lower resin casing for the injection molding. The upper resin casing is provided with a secondary projecting portion/a secondary dent portion formed at a secondary location corresponding to the primary location. The secondary projecting portion/the secondary dent portion projects/dents from/into a secondary parting-line of the upper resin casing for the injection molding. The lower and the upper resin casings are held by each other so as to match with each other in the depth direction by engaging the primary dent portion/the primary projecting portion and the secondary projecting portion/the secondary dent portion.

According to an aspect of this invention, a peripheral apparatus is arranged in adjacent to a casing of a personal computer with being electrical connection with the personal computer and used for the personal computer. The peripheral apparatus is assembled by packaging therein an electrical unit capable of being installed in the casing of the personal computer. The peripheral apparatus comprises lower and upper resin casings made from resin by an injection molding and engaged to each other so as to upwardly and downwardly cover the electrical unit and a resin holder made from resin by the injection molding and attached to a side surface of the lower and the upper resin casings in a width direction of the peripheral apparatus for holding the lower and the upper resin casings so that the lower and the upper resin casings are held by each other. The resin holder is provided with a foot portion projecting downwardly from the lower resin casing when the resin holder is attached to the side surface of the lower and the upper resin casings engaged to each other, the resin holder therefore serving as a leg for installing the peripheral apparatus.

According to another aspect of this invention, a peripheral apparatus is arranged in adjacent to a casing of a personal computer so as to be substantially level with the ground in width and depth directions of the peripheral apparatus with being electrical connection with the personal computer and used for the persona computer. The peripheral apparatus is assembled by packaging therein an electrical unit capable of being installed in the casing of the personal computer. The peripheral apparatus comprises lower and upper resin casings made from resin by an injection molding and engaged to each other so as to upwardly and downwardly cover the electrical unit and a resin holder made from resin by the injection molding and attached to a side surface of the lower and the upper resin casings in a width direction of the peripheral apparatus for holding the lower and the upper resin casings so that the lower and the upper resin casings are held by each other. When the resin holder is attached to the side surface of the lower and the upper resin casings engaged to each other, an outward surface in the width direction of the resin holder is inclined at no smaller than a predetermined angle to a height direction of the peripheral apparatus.

According to the other aspect of this invention, a peripheral apparatus is arranged in adjacent to a casing of a personal computer with being electrical connection with the personal computer and used for the personal computer. The peripheral apparatus is assembled by packaging therein an electrical unit capable of being installed in the casing of the personal computer and having a part exhausting heat and a chassis. The chassis is electrically and thermally connected to the ground of an electric circuit of the electric unit. The peripheral apparatus comprises lower and upper resin casings made from resin by an injection molding and a shield plate made from metal. The lower and the upper resin casings are held by each other so as to upwardly and downwardly cover the electrical unit. The shield plate is installed between the electrical unit and the lower and the upper resin casings engaged to each other and being electrically and thermally connected to the chassis.

DESCRIPTION OF THE PREFERRED EMBODIMENT

In order to facilitate an understanding of this invention, description will at first be made with reference to the drawings about a conventional peripheral apparatus.

Figure 1A:
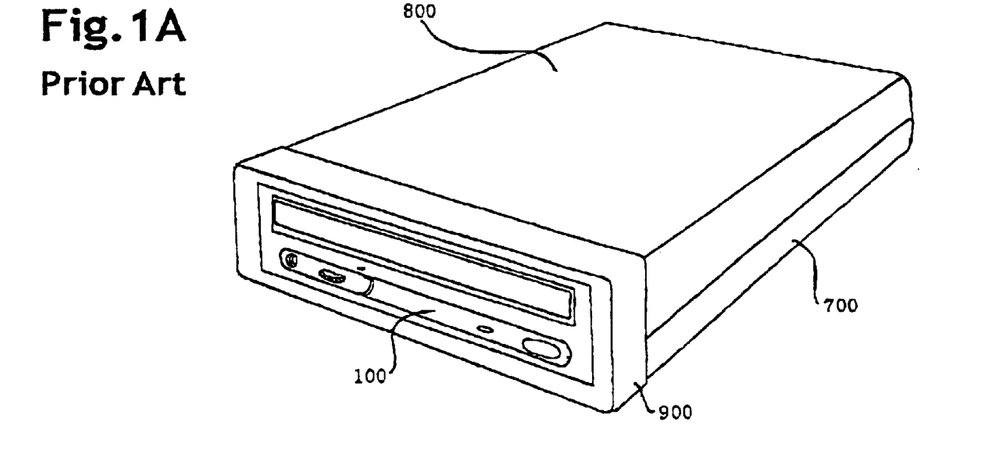
FIG. 1A is a perspective view showing a conventional peripheral apparatus and FIG. 1B is a side view partly showing the conventional peripheral apparatus.
Figure 1B:
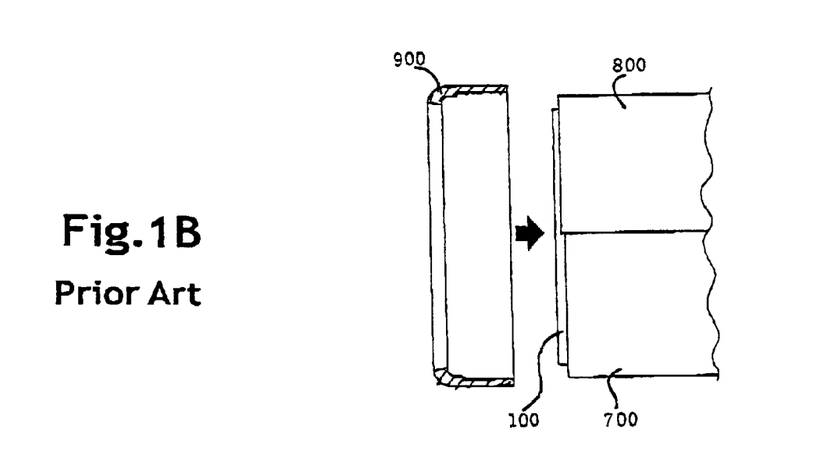

Referring to FIG. 1A, a conventional peripheral apparatus (as the type 3 mentioned before) has lower and upper pieces 700 and 800 for covering an electrical unit 100 and a front holder 900. If the lower and the upper pieces 700 and 800 are coupled with each other so as to be offset to each other in the depth direction as shown in FIG. 1B, this offset is hidden by the front holder 900. Thus, the type 3 can change a defection article caused by an appearance defection by the offset into a passing article if the offset exerts bad influence upon movement of the electrical unit.

The conventional peripheral apparatus has disadvantages, as described in the preamble of the instant specification.

Now, preferred embodiment of this invention is described with reference to FIGS. 2 to 6.

Referring to FIGS. 2, 3, and 4A to 4D, a peripheral apparatus for a personal computer, as like as the conventional peripheral apparatus shown in FIGS. 1A and 1B, is arranged in adjacent to a casing of the personal computer (not shown) with being electrical connection with the personal computer and used for the personal computer. The peripheral apparatus is assembled by packaging therein a CD-RW unit having a front panel 120 attached to a front portion thereon in a depth direction (as shown by an arrow D). The CD-RW unit 100 is capable of being installed in the casing of the personal computer with exposing the front panel 120 outwardly.

The peripheral apparatus comprises the CD-RW unit 100, an interface circuit 600, lower and upper resin casings 200 and 300.

The peripheral apparatus is electrically connected to the personal computer through the interface circuit 600. In this embodiment, the peripheral apparatus serves as a storage apparatus for recording/reproducing data to/from the CD-R and the CD-RW and for reproducing data from the CD-ROM. Furthermore, the interface circuit 600 is the USB 2.x type.

The lower and the upper resin casings 200 and 300 are made from resin (ABS: Acrylonitrile Butadiene Styrene in this embodiment) by an injection molding and is engaged to each other so as to upwardly and downwardly (in a height direction as shown by an arrow H) cover the CD-RW unit 100. The lower and the upper resin casings 200 and 300 are made so as to have round shape and translucent color added white pigment. On the other hand, the front panel 120 is designed into square and flat shapes because the front panel 120 may be also used as an interior unit for the personal computer designed into square shape.

The lower resin casing 200 is provided with primary dent portions 201 (see FIG. 3A) formed at a primary location in the, depth direction of the peripheral apparatus. The primary dent portion 201 dents into (over) a primary parting-line L1 of the lower resin casing 200 for the injection molding. In contrast, the upper resin casing 300 is provided with secondary projection portions 301 (see FIG. 3B) formed at a secondary location corresponding to the primary location. The secondary projecting portion 301 projects from (over) a secondary parting-line L2 of the upper resin casing 300 for the injection molding. The lower and the upper resin casings 200 and 300 are engaged to each other so as to match with each other in the depth direction by engaging the primary dent portion 201 and the secondary projecting portion 301. Thus, although the peripheral apparatus ha no additional part such as the front holder 900 as shown in FIGS. 1A and 1 B, the peripheral apparatus can change a defection article caused by an appearance defection by the offset into a passing article.

The lower and the upper resin casings 200 and 300 are held by each other by holding means. The holding means are constituted by four combinations of a projection 302 and an elastic piece 202 provided with a dent. The projection 302 is formed on the upper resin casing 300. The elastic piece 202 provided with the dent is formed on the lower resin casings 200. Namely, the lower and the upper casings 200 and 300 are removably engaged to each other without using screws. Thus, the manufacture and the user of the peripheral apparatus can easily engage/remove the lower and the upper casings 200 and 300 to each other.

Furthermore, the lower and the upper resin casings 200 an 300 are provided with hem potions 203 and 303, respectively. The hem portions 203 and 303 can blind a peripheral rim of the front panel 120 when the lower and the upper resin casings 200 and 300 are engaged to each other as apparent from FIGS. 4B to 4C. Although the hem portions 203 and 303 can blind the peripheral rim of the front panel 120, the hem portions 203 and 303 never interfere with the front panel 120 because the hem portions 203 and 303 are left from the peripheral rim of the front panel 120. Consequently, the lower and the upper resin casings 200 and 300 can permit the CD-RW unit 100 to slightly offset in the depth direction. Thus, the peripheral apparatus can change a defection article caused by the appearance defection by the offset of the front panel 120 against the casing into a passing (an acceptance) article if the offset exerts bad influence upon movement of the peripheral apparatus.

Figure 2:
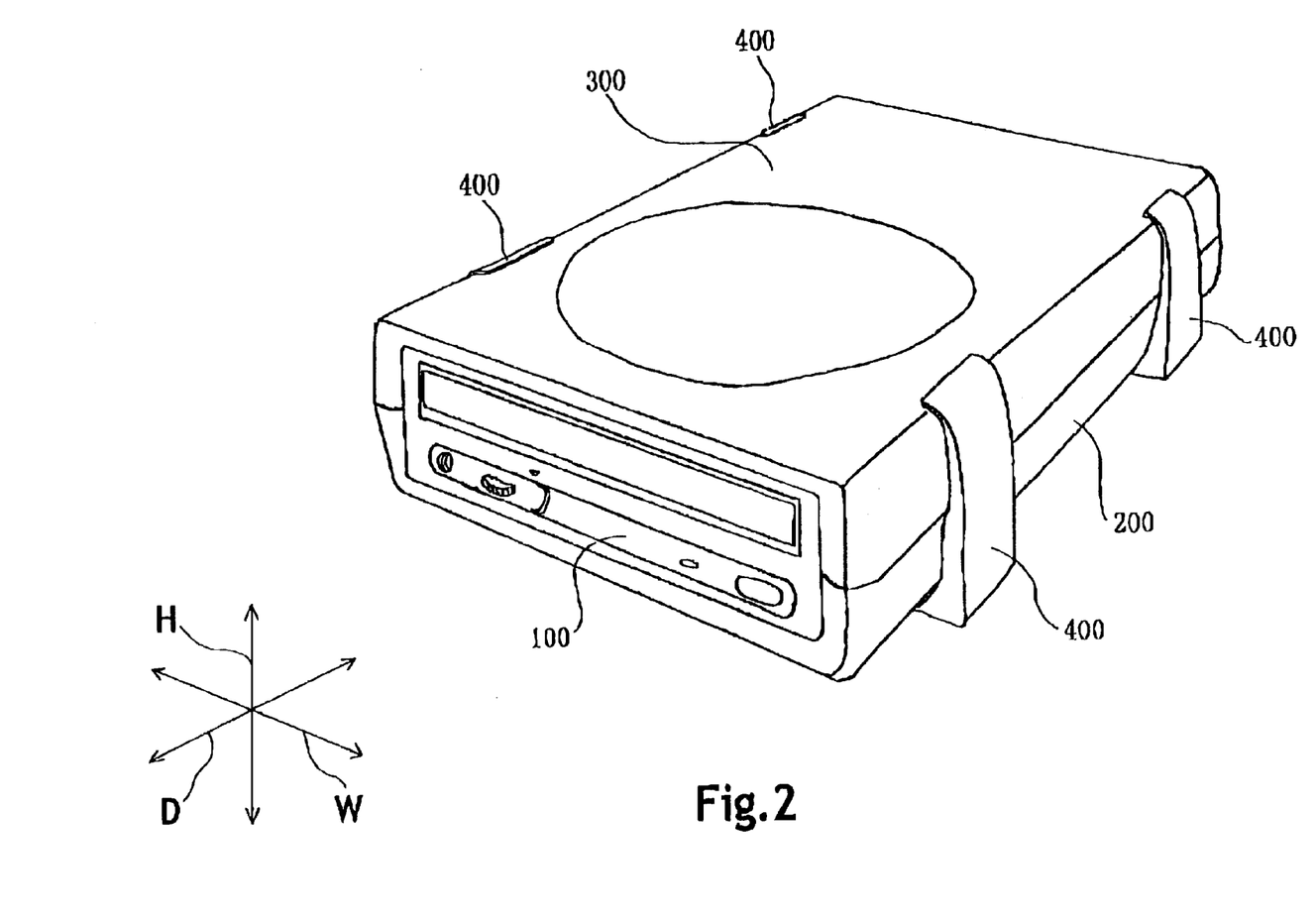
FIG. 2 is a perspective view showing a peripheral apparatus according to an embodiment of this invention.
Figures 3, 3A, 3B:
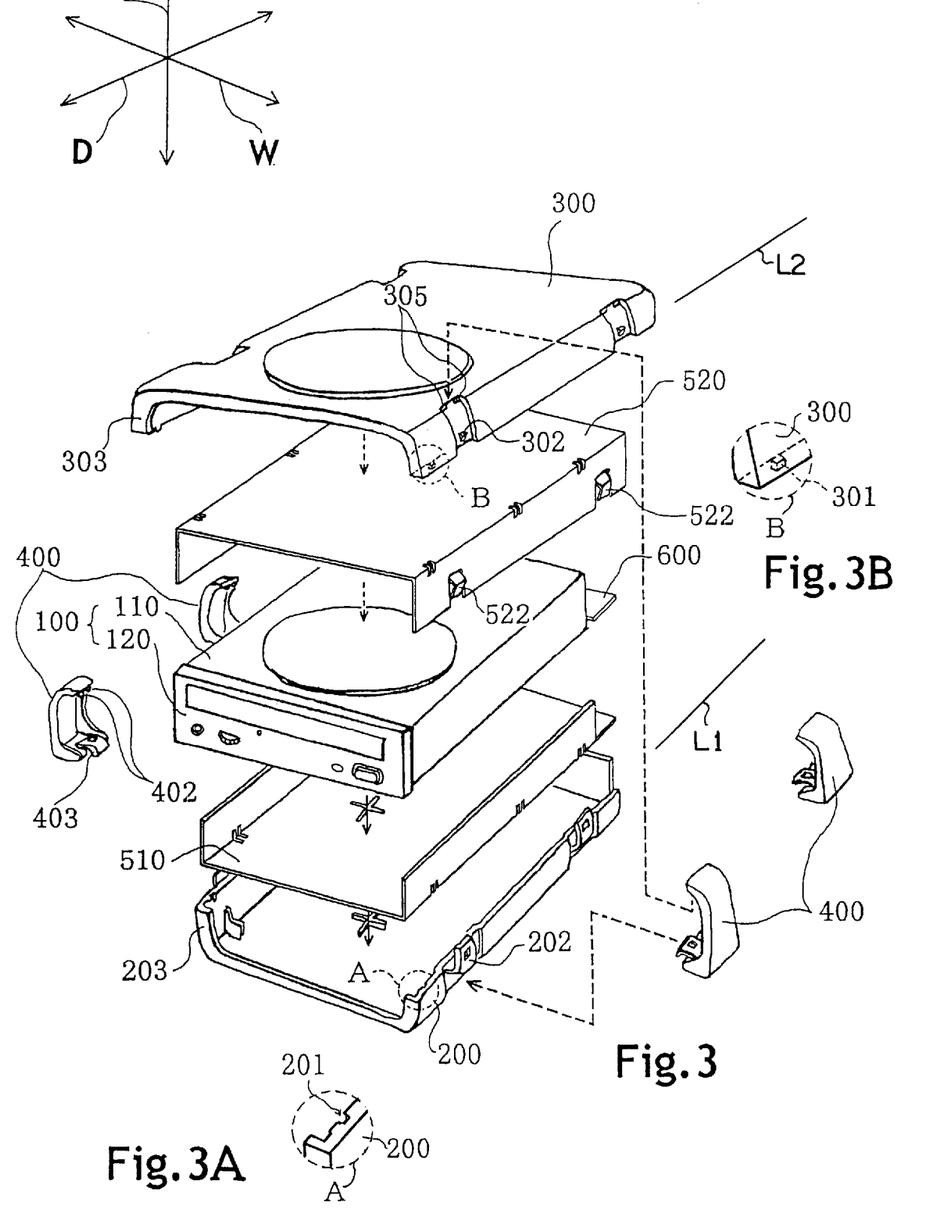
FIG. 3 is a perspective view showing the peripheral apparatus shown in FIG. 1 disassembled apart.
FIGS. 3A and 3B are enlarged views of respective circled portions A and B shown in FIG. 3.
Figure 4A:
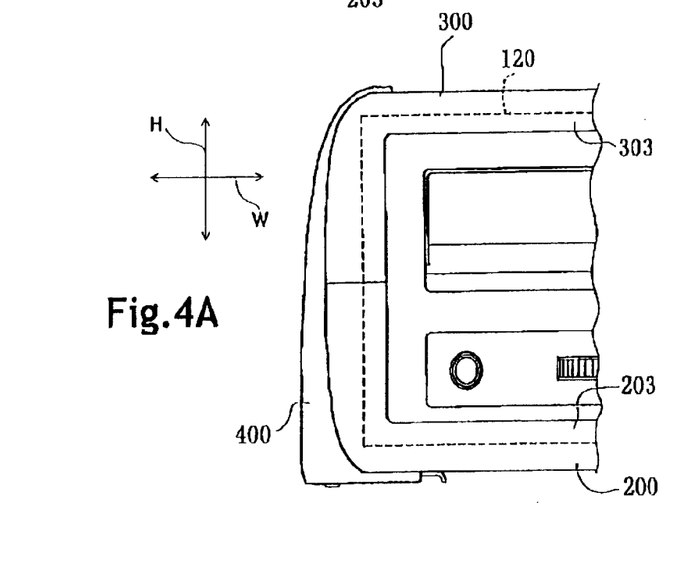
FIGS. 4A, 4B, 4C, and 4D are respectively front, cross sectional, cross sectional, and side views partially showing the peripheral apparatus shown in FIG. 2.
Figure 4B:
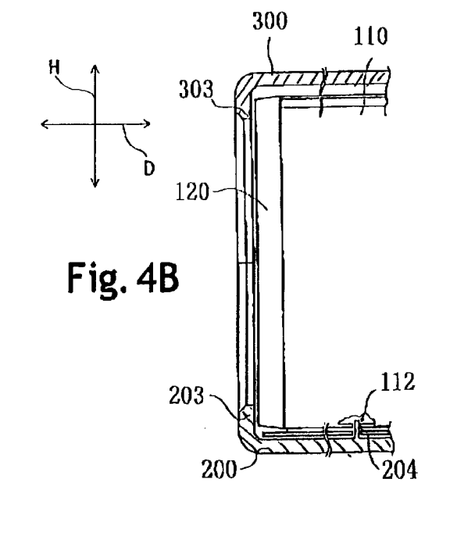
Figure 4C:
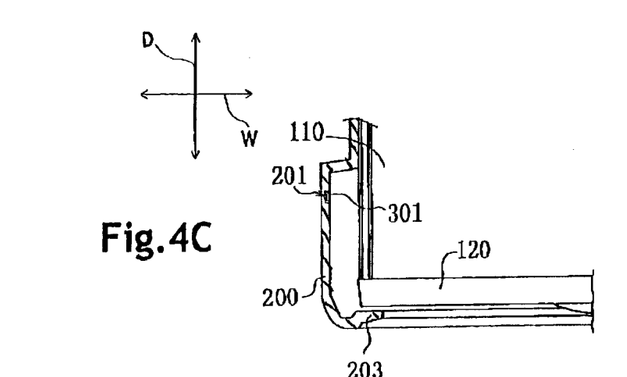
Figure 4D:
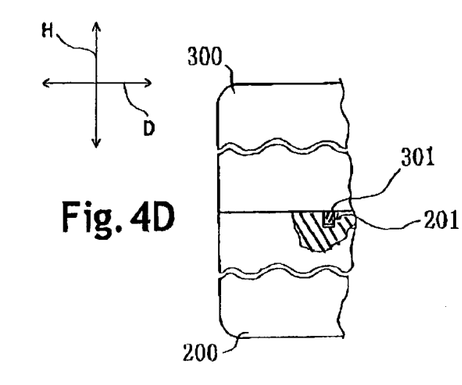
Figure 5A:
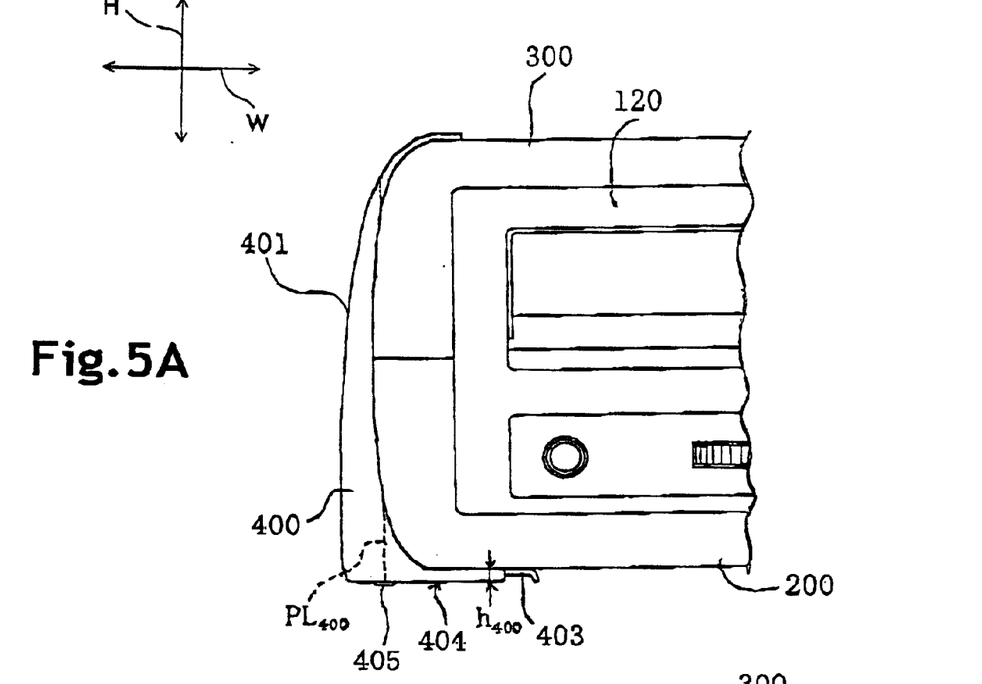
FIGS. 5A and 5B are front and cross sectional views partially showing the peripheral apparatus shown in FIG. 2.
Figure 5B:
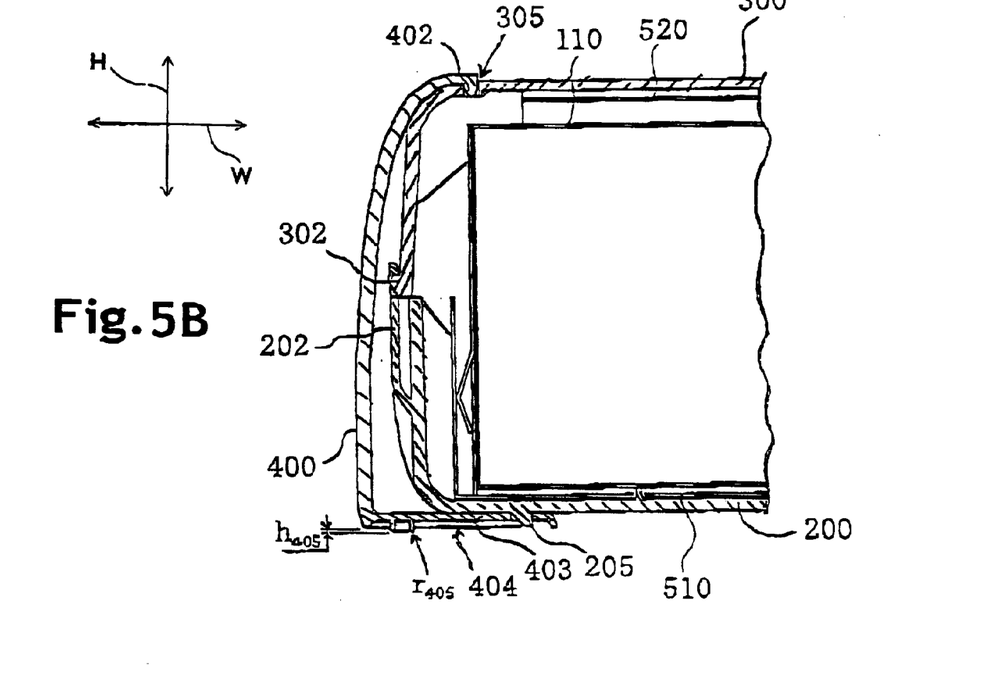

Referring to FIGS. 5A and 5b with merging with FIGS. 2 to 4, the peripheral apparatus further has four resin holders 400. The resin holder 400 is made so as to have round shape and translucent color added pigment.

The resin holder 400 has a bottom surface 400 located at bottom when the side surface in a width direction (as shown by an arrow W) of the lower and the upper resin casings 200 and 300 engaged to each other. The bottom surface 404 projects downwardly for a height $h_{400}$ from a bottom surface of the lower resin casing 200.

The resin holder 400 is provided with a foot portion 405 projects downwardly for a height $h_{405}$ from the bottom surface 404 when the resin holder 400 is attached to the lower and the upper resin casings 200 and 300 engaged to each other. The resin holder 400 serves as a leg for installing the peripheral apparatus.

The foot portion 405 is formed by the injection molding with using a slide mold. A bottom surface located downwardly of the foot panel 405 is chamfered up (so that a round $r_{405}$ is formed). Herein, when the resin holder 400 is made by the injection molding, a parting line $PL_{400}$ is generally designed as shown in FIG. 5A. Therefore, the resin holder 400 may be burry along the parting line $PL_{400}$. Particularly, if the bottom surface 404 is burry and projects downwardly, the peripheral apparatus installed on a desk is unstable and damages the desk. However, if the resin holder 400 is burry, it is difficult to project over the bottom surface 404 and the foot portion 405. Furthermore, because the round $r_{405}$ is formed, the resin holder 400 never damages the desk.

The resin holder 400 is further provided with primary projecting portions 402 and an elastic piece 403 provided with a dent. The primary projecting portions can be engaged to dent portions 305 formed on the upper resin casing 300. The elastic piece 403 provided with the dent can be engaged to a projecting portion 205 formed on the lower resin casing 200. The resin holder 400 is removably engaged to the lower and the upper resin casings 200 and 300 engaged to each other without using screws. Thus, the manufacture and the user of the peripheral apparatus can easily engage/remove the resin holder 400 to/from the lower and the upper casings 200 and 300.

Furthermore, when the resin holder 400 is engaged to the lower and the upper resin casings 200 and 300 engaged to each other, the resin holder 400 can blind the combination for engaging the lower and the upper resin casings 200 and 300 to each other. Thus, the resin holder 400 can prevent child from unnecessarily removing the lower and the upper resin casings 200 and 300 and from encountering accident.

The resin holder 400 further performs another function. Namely, when the resin holder 400 is attached to the side surface of the lower and the upper resin casings 200 and 300 engaged to each other, an outward surface 401 in the width direction of the resin holder 400 is inclined at no smaller than a predetermined angle to the height direction of the peripheral apparatus. Thus, the peripheral apparatus can prevent itself from being installed as the vertical installation so as to be substantially level with the ground in the width and the depth directions. The peripheral apparatus installed as level installation never drops the CD-ROM, the CD-R, or the CD-RW. The angle of the outward surface might be designed so as to prevent the peripheral apparatus from being installed as the vertical installation with taking balances of size, shape, and weight of the peripheral apparatus into consideration. In this embodiment, the outward surface 401 of the resin holder 400 is curved such that an angle of each tangent lines contacted to the outward surface 401 is gradually changed. More concretely, the outward surface 401 approximately has two curves. One of the curves is approximately 120 mm in curve rate (radius). The other of curves is approximately 6 mm in curve rate (radius). The peripheral apparatus is approximately 50 mm in height. The outward surface of the resin holder curved or not is both applicable to this invention.

The peripheral apparatus may have a spare resin holder (not shown) made from resin by the injection molding for being changed from the resin holder 400. The spare resin holder has the same shape and the same size as the resin holder 400. Namely, the spare resin holder is made so as to have round shape and translucent color added pigment different from the resin holder 400. Because the user easily can the resin holder 400 remove/engage from/to the peripheral apparatus as mentioned above, the user can also change the resin holder 400 to the spare resin holder according to her or his taste.

Referring to FIGS. 6A to 6D with merging with FIGS. 2 to 5, the peripheral apparatus further comprises lower and upper shield plates 510 and 520. The lower and the upper shield plates 510 and 520 are installed between the CD-RW unit 100 and the lower and the upper resin casings 200 and 300 engaged to each other. The upper shield plates 510 and 520 are electrically and thermally connected to the chassis 110. The lower and the upper shield plates 510 and 520 are made of steel sheet such as an SPTE sheet and has therefore elastically.

The upper shield plate 520 is provided with four projecting pieces 522. The projection piece 522 projects to outwardly in the width direction. When the shield plate 520 is installed between the CD-RW unit 100 and the lower and the upper resin casings 200 and 300 engaged to each other, the projecting piece 522 projected outwardly is forced from a rib formed on an inner surface of the lower resin casing 200 through the lower shield plate 510. Consequently, the projecting piece 522 forces as reaction a main body of the upper shield plate 520 against the chassis 110 of the CD-RW unit 100. Thus, the chassis 110 of the CD-RW unit 100 is electrically and thermally connected to the upper side and the lower shield plates 520 and 510. Herein, the projecting piece 522 is originally projected for scale larger than a space $S_{13}$ (shown in FIG. 6B) before the upper shield plate 520 is installed in the peripheral apparatus. When the upper shield plate 520 is installed in the peripheral apparatus, the projecting piece 522 generates reaction force by elastically.

The CD-RW unit 100 is supported by ribs formed on inner surfaces of the upper resin casing 200 and 300. The lower and the upper shield plates 510 and 520 are supported by the ribs and the CD-RW unit 100. Namely, the CD-RW unit 100 and the lower and the upper shield plates 510 and 520 are supported in the lower and the upper resin casing 200 and 300 without using screws. Thus, the manufacture of the peripheral apparatus can easily assemble/disassemble the peripheral apparatus.

The lower and the upper shield plates 510 and 520 respectively have a region such that both of inner and outer surfaces thereof are spaced from any parts of said peripheral apparatus.

Figure 6A:
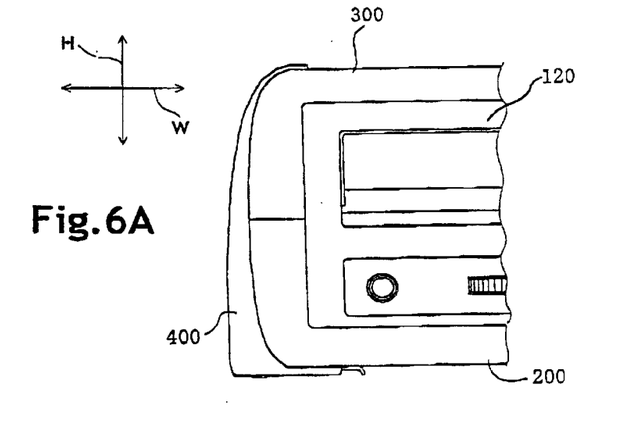
FIGS. 6A, 6B, 6C, and 6D are respectively front, cross sectional, cross sectional, and cross sectional views partially showing the peripheral apparatus shown in FIG. 2.
Figure 6B:
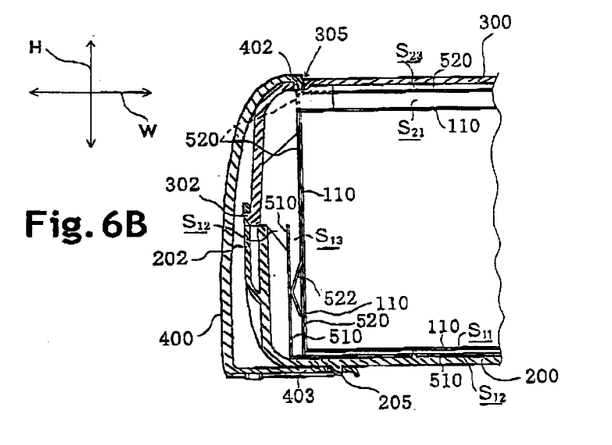
Figure 6C:
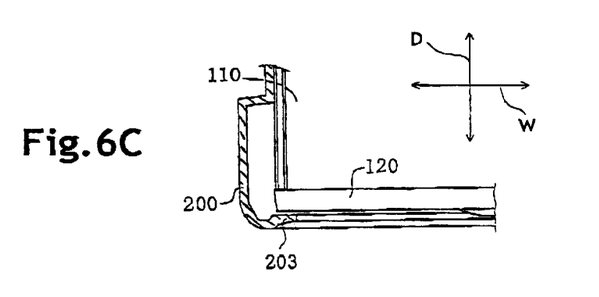
Figure 6D:
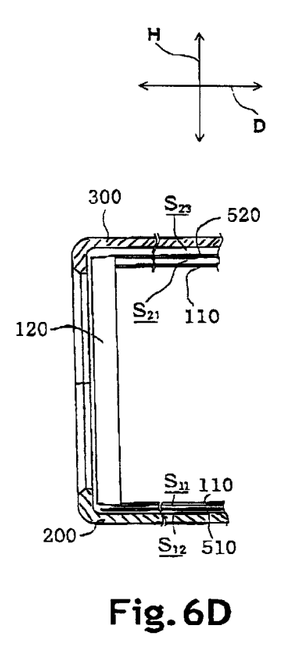

Concretely, the lower shield plates 510 has a region where an inward surface is spaced for a space $S_{11}$ from the chassis 110 of the CD-RW unit 100 and where an outward surface is spaced for a space $S_{12}$ from the inner surface of the lower resin casing 200 as shown in FIG. 6D. The lower shield plate 510 further has a region where the inward surface is spaced for the space $S_{13}$ from the upper shield plate 520 and where the outward surface is spaced for the space $S_{12}$ from the inner surface of the lower resin casing 200 as shown in FIGS. 6B and 6D. On the other hand, the upper shield plate 520 has a region where an inward surface is spaced for a space $S_{21}$ from the chassis 110 of the CD-RW unit 100 and where an outward surface is spaced for a space $S_{23}$ from an inner surface of the upper resin casing 300 as shown in FIGS. 6B and 6D. Namely, the lower and the upper shield plates 510 and 520 electrically and thermally connected to the chassis 110 of the CD-RW unit 100 are respectively exposed to the air over a very wide area. Thus, the lower and the upper shield plates 510 and 520 sufficiently perform not only the electrical shield function but also the thermal radiating function just like a heat sink.

While this invention has thus far been described in conjunction with an embodiment thereof, it will readily be possible for those skilled in the art to put this invention into practice in various other manners. For example, the peripheral apparatus is never applied to only the CD-RW drive and therefore may be applied to another storage drive such as the DVD-RAM drive or a hard disk drive still or non-storage apparatus.

What is claimed is:

1. A peripheral apparatus adapted to be arranged adjacent to a casing of a personal computer and to be electrically connected to the personal computer, said peripheral apparatus comprising:

an electrical unit adapted to be installed in the casing of the personal computer;

lower and upper resin casings made from resin by injection molding and adapted to be engaged to each other so as to upwardly and downwardly cover said electrical unit; and four resin members made from resin by injection molding and adapted to be attached to side external surfaces of said lower and said upper resin casings in a width direction of said peripheral apparatus at front and rear locations in a depth direction of said peripheral apparatus;

wherein said resin members have a same size and shape as each other; and wherein said resin members are provided with a foot portion projecting downwardly from said lower resin casing when said resin members are attached to said side external surface of said lower and said upper resin casings engaged to each other, such that said resin members are adapted to serve as legs for installing said peripheral apparatus.

2. A peripheral apparatus as claimed in claim 1, wherein said foot portion is formed by injection molding using a slide mold, and a bottom surface of said foot portion is chamfered.

3. A peripheral apparatus as claimed in claim 1, wherein:

said resin members are provided with: (i) one of a dent portion and a primary projecting portion for engaging with one of a projecting portion and a dent portion formed on one of said lower and said upper resin casings, and (ii) an elastic piece provided with one of a dent portion and a secondary projecting portion for engaging with one of a projecting portion and a dent portion formed on the other of said lower and said upper resin casings; and said resin members are removably attachable to said lower and said upper resin casings when said lower and said upper resin casings are engaged to each other.

4. A peripheral apparatus as claimed in claim 1, wherein said lower and said upper resin casings are held by each other by a combination of a projection and an elastic piece provided with a dent;

said projection being formed at said side surface in the width direction of one of said lower and said upper resin casings;

said elastic piece provided with said dent being formed at said side surface in the width direction of the other of said lower and said upper resin casings; and said resin members being adapted to be engaged to said lower and said upper resin casings so as to blind said combination.

5. A peripheral apparatus as claimed in claim 1, wherein said peripheral apparatus comprises four spare resin members made from resin by injection molding for being interchanged for said four resin members;

said spare resin members having a same shape and size as said four resin members.

6. A peripheral apparatus as claimed in claim 1, wherein said peripheral apparatus is adapted to be electrically connected to the personal computer through a USB (Universal Serial Bus) or an IEEE (Institute of Electrical and Electronics Engineers) 1394 as an interface for data-communication and serves as a storage apparatus for outputting/inputting data to/from the personal computer and reproducing/recording the data from/to a recording medium which is included in or installed into said storage apparatus.

7. A peripheral apparatus adapted to be arranged adjacent to a casing of a personal computer so as to be substantially level with the ground in width and depth directions of said peripheral apparatus and to be electrically connected to the personal computer, said peripheral apparatus comprising:

an electrical unit capable of being installed in the casing of the personal computer;

lower and upper resin casings made from resin by injection molding and adapted to be engaged to each other so as to upwardly and downwardly cover said electrical unit; and four resin members made from resin by the injection molding and adapted to be attached to side external surfaces of said lower and said upper resin casings in a width direction of said peripheral apparatus at front and rear locations in a depth direction of said peripheral apparatus;

wherein said resin members have a same shape and size as each other; and wherein when said resin member is attached to said side external surface of said lower and said upper resin casings when said lower and said upper resin casings are engaged to each other, an outward surface in said width direction of said resin member is inclined at no smaller than a predetermined angle to a height direction of said peripheral apparatus.

8. A peripheral apparatus as claimed in claim 7, wherein said outward surface of said resin member is curved.

9. A peripheral apparatus as claimed in claim 7, wherein:

said resin members are provided with: (i) one of a dent portion and a primary projecting portion for engaging with one of a projecting portion and a dent portion formed on one of said lower and said upper resin casings, and (ii) an elastic piece provided with one of a dent portion and a secondary projecting portion for engaging with one of a projecting portion and a dent portion formed on the other of said lower and said upper resin casings; and said resin members are removably attached to said lower and said upper resin casings when said lower and said upper resin casings are engaged to each other.

10. A peripheral apparatus as claimed in claim 7, wherein said peripheral apparatus comprises four spare resin members made from resin by injection molding for being interchanged for said four resin members;

said spare resin members having a same shape and size as said four resin members.

11. A peripheral apparatus as claimed in claim 7, wherein said lower and said upper resin casings are held by each other by a combination of a projection and an elastic piece provided with a dent;

said projection being formed at said side surface in the width direction of one of said lower and said upper resin casings;

said elastic piece provided with said dent being formed at said side surface in the width direction of the other of said lower and said upper resin casings; and said resin members being adapted to be engaged to said lower and said upper resin casings so as to blind said combination.

12. A peripheral apparatus as claimed in claim 7, wherein said peripheral apparatus is adapted to be electrically connected to the personal computer through a USB (Universal Serial Bus) or an IEEE (Institute of Electrical and Electronics Engineers) 1394 as an interface for data-communication and serves as a storage apparatus for outputting/inputting data to/from the personal computer and reproducing/recording the data from/to a recording medium which is included in or installed into said storage apparatus.

* * * * *